United States Patent [19]
Graves et al.

[11] Patent Number: 5,277,455
[45] Date of Patent: Jan. 11, 1994

[54] PLASTIC LINED DUAL CONTAINMENT PIPING SYSTEM

[75] Inventors: Gail W. Graves, Richmond; Bernd Schulte-Ladbeck, Houston, both of Tex.

[73] Assignee: Performance Plastics Products, Inc., Houston, Tex.

[21] Appl. No.: 951,215

[22] Filed: Sep. 25, 1992

[51] Int. Cl.$^5$ .............................................. F16L 9/14
[52] U.S. Cl. ....................................... 285/55; 285/363; 285/368; 285/138; 285/93; 285/910; 29/451; 73/46; 73/49.1
[58] Field of Search ................... 285/55, 910, 93, 138, 285/363, 368; 29/451, 455; 264/269; 138/DIG.; 73/46, 49.1, 49.3

[56] References Cited

U.S. PATENT DOCUMENTS

| | | | |
|---|---|---|---|
| 724,675 | 4/1903 | Decker . | |
| 3,141,685 | 7/1964 | Watts | 285/93 |
| 3,284,107 | 11/1966 | West | 285/55 |
| 3,301,277 | 1/1967 | Kelly | 138/114 |
| 3,317,221 | 5/1967 | Brown | 285/39 |
| 3,335,758 | 8/1967 | Bertolet, Jr. | 285/55 |
| 3,593,391 | 7/1971 | Routh | 285/55 |
| 3,615,984 | 10/1971 | Chase | 285/55 |
| 4,146,050 | 3/1979 | Graves | 137/375 |
| 4,288,105 | 9/1981 | Press | 285/55 |
| 4,365,404 | 12/1982 | Castro et al. | 285/55 |
| 4,384,736 | 5/1983 | Hartung | 285/93 |
| 4,537,425 | 8/1985 | Press et al. | 285/55 |
| 4,619,470 | 10/1986 | Overath et al. | 285/55 |
| 4,667,505 | 5/1987 | Sharp | 73/40.3 |
| 4,691,740 | 9/1987 | Sveilik et al. | 285/55 |
| 4,795,174 | 1/1989 | Whitlow | 277/213 |
| 5,149,142 | 9/1992 | Walko et al. | 285/55 |
| 5,171,041 | 12/1992 | McMillan et al. | 285/55 |
| 5,224,738 | 7/1993 | Taga | 285/55 |

FOREIGN PATENT DOCUMENTS

| | | | |
|---|---|---|---|
| 678400 | 1/1964 | Canada | 285/55 |
| 726589 | 1/1966 | Canada | 285/55 |
| 2607505 | 9/1977 | Fed. Rep. of Germany . | |
| 2757219 | 7/1979 | Fed. Rep. of Germany . | |
| 3605944 | 8/1987 | Fed. Rep. of Germany | 285/55 |
| 275990 | 11/1989 | Japan | 285/55 |

Primary Examiner—Eric K. Nicholson
Attorney, Agent, or Firm—Arnold, White & Durkee

[57] ABSTRACT

Methods and apparatus for improved containment, detection, and monitoring of leaks of piped substances in which piping systems are constructed of connections of flanged, plastic-lined concentric pipe segments, these segments each having an inner and outer shell with an annulus therebetween and an aperture connecting the annulus with the exterior flange face of the pipe segment. A connector is described which may be placed between pipe segments to be connected and which has annular resilient sealing members and inner plastic seals to provide seals at the connection. The piping system provides an annular containment passageway to capture fluid escaping from the inner shell of a pipe segment and communicate the fluid to a fluid detection port in the connector. The annular containment passageway comprises at least one pipe segment annulus, at least one aperture in the pipe segment, and an annular fluid opening at the connector to communicate fluid toward the fluid detection port.

17 Claims, 3 Drawing Sheets

PLASTIC LINED DUAL CONTAINMENT PIPING SYSTEM

BACKGROUND OF THE INVENTION

The present invention relates to methods and apparatus for dual containment of piped substances. The invention more particularly relates to piping systems constructed of flanged concentric pipe segments and having an interior plastic liner to protect the segments from corrosive piped substances. The invention permits fluids, which may leak from the inner shell of a concentric or dual-walled pipe segment, to be detected before escape of the fluid into the environment. The invention features a connector that provides a secure and reliable seal between connected pipe segments and enables leak detection monitoring to be conducted at such connection points. The invention also features a novel concentric-type pipe segment design having an annulus, a flange which presents an exterior axial flanged face, and an aperture communicating the annulus with the exterior flange face. The aperture is adapted to transmit fluid which has leaked from the inner shell of the pipe segment into communication with a connector which adjoins the exterior flange face.

Many facilities which handle hazardous or caustic chemicals cannot permit even tiny amounts of piped substances to escape without risking significant health or environmental consequences. Accordingly, a number of apparatuses and techniques have been suggested for containing and detecting leaks in piping systems. Some of these suggestions have involved the use of concentric pipe segments. One such suggestion, for instance, features a piping system of flanged concentric pipe segments in which the segments have an interspace defined between the inner and outer segments. Leak detection fittings are positioned along outer pipe segments which permit monitoring of escaped material into the interspace. This type of piping system may include a passage extending through the flange of a pipe segment, whereby leakage between flanges of abutting pipe segments may be flushed from the passage. Inner and outer O-ring seals on the flanges may be used to bracket the entrance to the passage along the flange face.

Hazardous chemical piping systems also exist which employ rigid mating of adjacent components. Connectors are used which essentially transmit the entire bolt torque load from joined flanges of two pipe elements across a single metal ring. Such a system may permit higher bolt torque loads to be used in connecting the elements than other systems. However, the rigid mating of this system is vulnerable to vibration-induced fatigue and failure over time.

Although such systems facilitate control of leaks from piping system segments, they do not facilitate active monitoring of leaks at flanged connection points. In fact, it is at connection points that leakage is oftentimes most likely to occur. The escaping fluid can also breack outer O-ring seal and thereby result in fluid reaching the environment before it can be detected. This is a distinct possibility when the fluid is especially corrosive. O-ring seals, as well as rigid matings, at connection points also tend to fail or weaken when subjected to vibration, repeated temperature changes, impacts, fire, or other hazards.

In another background aspect it is noted that, while alternative piping systems exist which offer dual containment layers along the length of the pipe segments, these systems provide only a single acceptable fluid seal at leakage-prone flanged connection points. The absence of a second reliable seal against leaks belies such a system's claim of providing true dual containment. Clearly, systems that provide true dual containment and facilitate meaningful leak detection are desirable.

SUMMARY OF THE INVENTION

The present invention features a piping system constructed of flanged concentric pipe segments having inner and outer shells and preferably lined with plastic or other non-corrosive material along their interior. An annulus is defined between the inner and outer shells of the pipe segments. At either end of the pipe segment, an aperture is provided which communicates the annulus with the external axial flange face of the segment's flange.

A dual containment connector is also described which is adapted to be placed between adjacent concentric pipe segments. The connector has at least one port along its outer circumference to permit operable connection with fluid detection devices such as are known in the art. The dual containment connector includes annular resilient sealing members and plastic flanges to produce a secure and reliable seal between connected pipe segments. The connector further comprises a housing preferably constructed of durable and fire resistant material such as steel.

The invention provides for improved detection and prevention of leakage by providing an annular containment passageway which captures fluid escaping from the pipe's interior and allows detection before its escape into the environment. The annular containment passageway is formed by the annulus of at least one concentric pipe segment, at least one aperture communicating the annulus with the flange face, and an annular fluid opening within the connector. The annular fluid opening is adapted to engage the pipe segment's aperture, receive fluid from the aperture, and communicate it to the connector's fluid detection port.

DETAILED DESCRIPTION AND PREFERRED EMBODIMENTS

Figure 1:
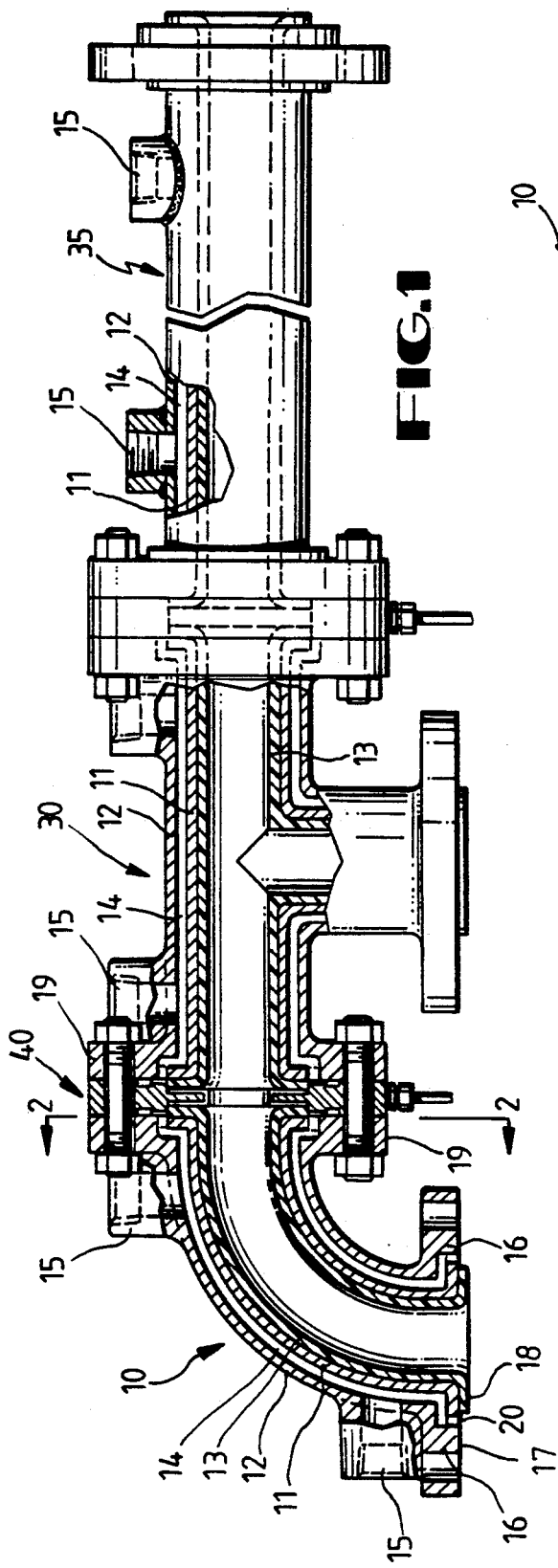
FIG. 1 shows a longitudinal partial cross-section of an exemplary concentric pipe segment of the present invention.

Pipe segments of the present invention include conventional straight runs of piping as well as curved sections and fittings such as tees, elbows, reducers and other conventional and unconventional piping designs. FIG. 1 shows exemplary pipe segments 10, 30, and 35 which illustrate three of the various pipe segment configurations. Each illustrated segment comprises inner shell 11 and outer shell 12, each having a first and a second end. Both shells 11 and 12 are preferably formed of rigid, durable material such as steel or ductile cast iron. The segments are termed concentric in that the inner and outer shells have generally the same axial center along their lengths, the outer shell 12 having a diameter greater than that of the inner shell 11. Inner shell 11's inner surface defines a fluid pathway through the length of the pipe segment. Shells 11 and 12 are joined at their first and second ends such that a flange 16 is formed. Annulus 14 is defined between the inner surface of outer shell 12 and the outer surface of inner shell 11. The outer shell 12 of the pipe segment can include one or more connection ports 15 which are adapted to permit connection of fluid detection devices of types known in the art.

The interior of inner shell 11 is lined with an inner plastic liner 13 which is typically formed of corrosion-resistant resins of types known in the art. In a preferred embodiment, plastic liner 13 comprises polytetrafluoroethylene (PTFE). Liners may also be used which are made from perfluoro alkoxyalkane (PFA), perfluoro ethylenepropylene (FEP), polyvinylidene fluoride (PVDF), and polypropylene (PP).

A system exemplified by that shown in FIG. 1 allows dual containment of piped substances. These substances are primarily intended to be contained within the central portion of inner shell 11 and inner plastic liner 13. In the event that liner 13 and inner shell 11 are breached, outer shell 12 provides a secondary means of containment.

Figure 3:
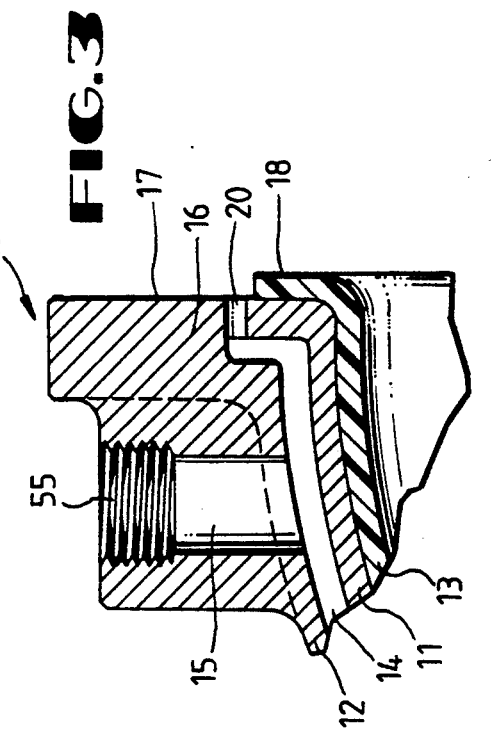
FIG. 3 is a side phantom detail of a flanged end of an exemplary pipe segment.
Figure 2:
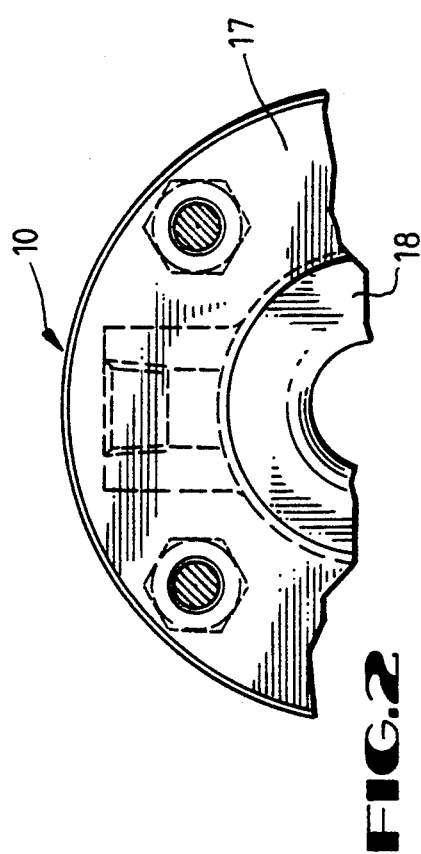
FIG. 2 is an end phantom detail of a flanged end of an exemplary pipe segment.

As indicated, each pipe segment terminates at its ends to form a flange. The flanges formed at the ends of the pipe segments is further illustrated in FIGS. 2 and 3 showing flange 16 of pipe segment 10. As is further indicated, inner and outer shells 11 and join at their ends to form annulus 14 and an exterior flange face 17. Plastic liner 13 is flared at its ends along flange face 17 to provide a plastic-liner flange face 18 over a portion of flange face 17. In an embodiment best shown in FIG. 5, the segment may be fitted with one or more lap flanges 19 to permit the segment to be fixedly connected to an adjoining segment. At least one aperture 20 is provided which communicates annulus 14 with flange face 17. As illustrated, the outside diameter of the plastic-liner flange face 18 is such that aperture 20 is not blocked by the plastic-liner flange. Moreover, aperture 20 is positioned in flange face 17 such that aperture 20 will be within the inside diameter surface of annular sealing members positioned between adjacent pipe segments. Similar configurations for aperture 20 can be seen in segments 30 and 35 in FIG. 1.

Figure 4:
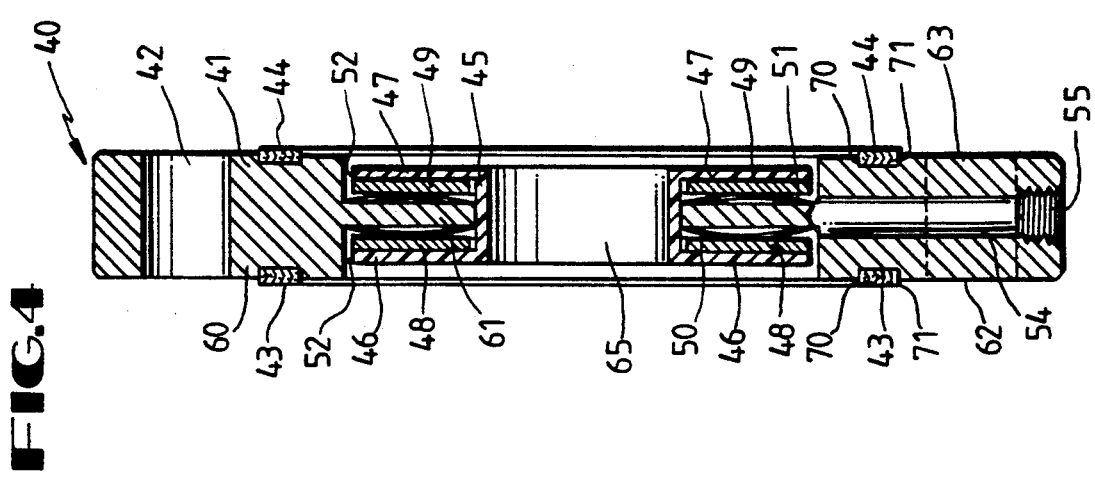
FIG. 4 is a side view cross-section of an exemplary connector of the present invention.
Figure 6:
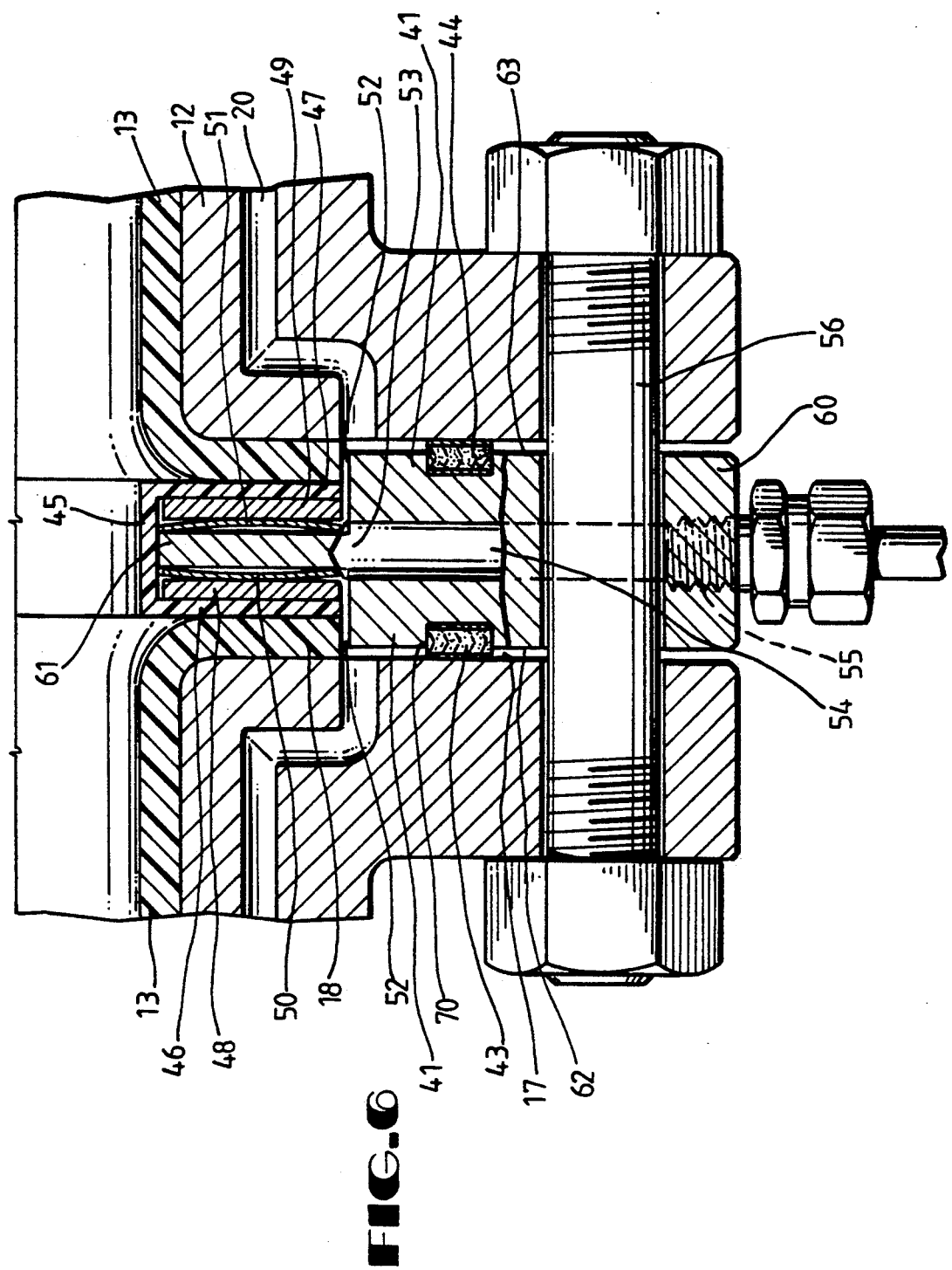
FIG. 6 is a cross-sectional detail, partially in phantom, showing a connection of two pipe segments and a connector.

Referring now to FIG. 4, dual containment connector 40 comprises a generally annular housing 41 preferably formed of a durable, fire-resistant material such as cast iron, steel or another metal to protect the connector from external hazards such as fire or impacts. Housing 41 defines a central fluid pathway 65 through housing 41 to facilitate fluid flow from one adjoining pipe segment to another adjoining pipe segment. Housing 41 comprises an outer housing section 60 and an inner housing section 61. Inner housing section 61 generally includes that portion of the housing 41 which will be lined with plastic liner 45 or adjoin a plastic-lined portion of pipe segments during construction of a piping system. Outer housing section 60 generally corresponds to the area of the housing lying radially outside the plastic-lined sections. Outer housing section 60 may include holes 42 to accommodate connection bolts or pins used to connect adjoining pipe segments. As is illustrated in FIGS. 4 and 6, axial sides of connector 40 present first and second housing faces 62 and 63 which are adapted for cooperating engagement with complementary flange faces 17 of adjoining pipe segments to be connected. Plastic liner 45 lines the central fluid pathway 65 of connector 40.

Housing 41 is fitted with first and second annular resilient sealing members 43 and 44 which are concentrically arranged upon first and second housing faces 62 and 63 and which are adapted to sealingly engage complementary flange faces 17 of adjoining concentric pipe segments to be connected. Sealing members 43 and 44 each present radially an inside diameter surface 70 and outside diameter surface 71. Preferably, sealing members 43 and 44 have a spring bias to urge seals against flange faces 17 of pipe segments to be connected. In a preferred embodiment, sealing members 43 and 44 comprise spiral-wound type gaskets of a type known in the art whose cross-section resembles a series of radially aligned leaf springs which can be axially compressed during a connection of adjoining pipe segments. A commercially available annular resilient sealing member of this type is the Flexitallic ® spiral-wound gasket with Flexicarb filler available from Flexitallic, Inc., Deer Park, TX 77536. Those skilled in the art will recognize that the sealing members 43 and 44 can be spring-biased in other ways as well, both mechanically and hydraulically.

Plastic liner 45 is flared at its axial ends to form first and second plastic flanges 46 and 47 upon either axial side of connector 40 which have an outside diameter which is less than the inside diameter surface of annular resilient sealing members 43 and 44. Plastic flanges 46 and 47 each present an interior housing face which axially faces connector 40 and an exterior plastic flange face which faces outwardly from connector 40 and is adapted to sealingly engage complementary plastic flange faces 18 of adjoining pipe segments to be connected.

Figure 5:
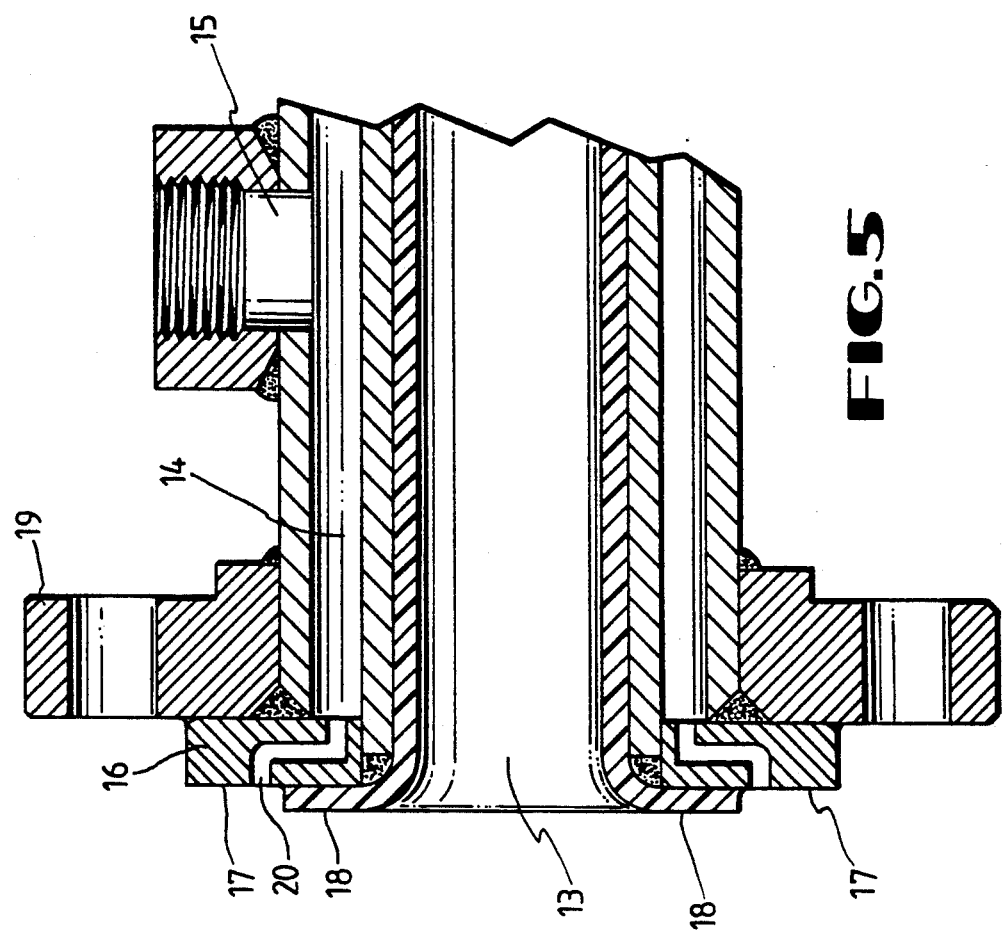
FIG. 5 is a side view cross-section of a flanged end of an exemplary pipe segment adapted to engage the exemplary connector of FIG. 4.

Referring to FIGS. 4-6, connector 40 provides for an inner seal wherein the exterior plastic flange faces of plastic flanges 46 and 47 are resiliently outwardly biased to seal against an adjoining segment's plastic lined flange faces 18 when the segments are connected to provide a secure and reliable seal. Rigid facings 48 and 49 and spring members 50 and 51 further ensure the seal by urging plastic flanges 46 and 47 against plastic-liner flange faces 18 while the segments are connected. Spring members 50 and 51 preferably comprise an annular spring member commonly referred to as a wave spring or wave spring washer. Acceptable commercially available wave springs for this application include those such as manufactured by Spring Engineers of 9740 Tanner Road, Houston, Tex. 77041.

Under bolt-torque compression loads, spring members 50 and 51, as well as sealing members 43 and 44 of exemplary connector 40, are axially compressed creating both inner and outer fluid-tight seals against pipe segments being joined. The specific recommended bolt-torque loads used in constructing piping systems with the inventive components may vary among particular systems. Generally, however, the bolt torque loads used should be sufficient to ensure axial compression of the spring members and annular resilient sealing members without being so great as to permanently deform them or remove their spring-like characteristics.

An outer seal is created between either of sealing members 43 and 44 and the flange face 17 to which each sealing member is mated. An inner seal is created between either of plastic flanges 46 and 47 and the plastic-liner flange face 18 to which each plastic flange is mated. Since both the inner and outer seals incorporate spring-bias means for sealing, the connector 40 is not rigidly mated to the pipe elements on either side of it. As a result, piping systems constructed in accordance with the present invention are better suited to resist vibration-induced fatigue and failure at connection joints than piping systems constructed by a rigid mating technique.

Referring to FIG. 6, a particularly preferred embodiment is shown in which housing 41 is adapted to communicate fluid from either axial side of housing 41 toward a connection port 53 through annular fluid openings 52 when the pipe segments are fixedly connected by, for instance, bolt 56 (see FIG. 6). As best seen in FIG. 6, fluid communication is even possible from one axial side of housing 41 to the other if fluid flows from one annular fluid opening to the other across the cavity in housing 41 formed by the connection port 53.

Annular fluid openings 52 are defined within housing 41 on either side of connector 40. The annular openings 52 are in fluid communication with connection port 53 and are adapted to receive fluid from an axially external source, such as the aperture 20 of an adjoining pipe segment, and transmit said fluid toward the connection port 53. The radially outward boundaries of annular fluid openings 52 are generally formed by the inside diameter surface 70 of sealing members 43 and 44 during connection of connector 40 with an adjoining pipe segment. FIG. 6 illustrates an exemplary technique for defining the annular fluid openings 52 wherein the openings are generally defined along their outer periphery by outer housing section 60 and the inside diameter surface 70 of annular resilient sealing members 43 and 44. The exemplary openings 52 are further defined along their inner periphery by the outer portions of inner housing section 61, rigid facings 48 and 49, spring members 50 and 51 and plastic flanges 46 and 47.

Connection port 53 is shown which is in fluid communication with annular openings 52. In one embodiment, connection port 53 comprises a shaft 54 to receive fluid from opening 52 and communicate it to the exterior periphery of housing 41. Threaded connection 55 in housing 41 permits operable connection of fluid detection or monitoring devices to connector 40 thereby permitting leakage into annulus 14 and transmitted toward the connector 40 to be detected. Exemplary connections of this type are shown in FIGS. 1 and 6.

In operation, the invention provides connected pipe segments with an annular containment passageway formed by the annulus 14 of at least one pipe segment, aperture 20, and annular fluid opening 52 of at least one connector 40. The establishment of an annular containment passageway permits true dual containment since reliable secondary containment may be made available at all points along a piping system, including the flanged connection points. Construction of a piping system in accordance with the present invention also permits improved fire safety by providing an outer seal which does not present plastic portions which may be subject to melting or degradation from fire.

Leakage from the inner shell 11 of at least one pipe segment of the piping system may be detected and monitored from the annular containment passageway as well. The annular containment passageway may include any number of connected pipe segments and connectors thereby offering numerous connection ports for leak detection at the connectors. Such leak detection points may be supplemented at connection ports 15 at points along the lengths of the segments as well. A suitable fluid detection device for use with the piping system is a detector for the particular substance flowing through the piping system. Fluid detection and leak monitoring devices known to be useful in common application include the hazardous gas monitor alarm available from Mitchell Instrument Co., San Marcos, Calif. 92069.

It will be apparent to those skilled in the art that many modifications may be made to the construction and arrangements of parts herein described without departing from the spirit and scope of the invention. While the invention has been described with respect to certain preferred embodiments, it should be understood that the inventive concepts disclosed herein are intended to be limited only by the following claims.

What is claimed is:

1. A pipe segment comprising:
  a. an inner shell of a first diameter having a first end and second end and an internal surface defining a fluid pathway through said pipe segment;
  b. an outer shell of a second diameter greater than said first diameter having a first end and second end, said inner and outer shells having generally the same axial center, said inner and outer shells defining an annulus therebetween, said inner and outer shells being joined to form a flange at said first and second ends of said pipe segment, said flanges presenting an exterior axial flange face; and
  c. an aperture communicating the annulus with the flange face; and
  d. a plastic liner which lines the interior of said inner shell, said plastic liner flared at its ends along said flange faces to provide a plastic flange face over at least a portion of said flange face;

2. The pipe segment of claim 1 further comprising one or more connection ports along the length of said outer shell, said connection ports adapted to communicate said annulus with the exterior of said pipe segment and to permit connection of fluid detection devices.

3. A pipe segment connector, comprising:
  a. a connector housing having first and second faces adapted for cooperating engagement with complementary flange faces of adjoining pipe segments to be connected; said connector housing further comprising a central fluid pathway through said connector housing for facilitating fluid flow from one adjoining pipe segment to another adjoining pipe segment;
  b. first and second annular resilient sealing members concentrically arranged on said first and second housing faces around said central fluid pathway, said sealing members having an outside diameter surface and an inside diameter surface and adapted to sealingly engage complementary flange faces of adjoining pipe segments to be connected;
  c. a plastic liner lining said central fluid pathway, said plastic liner flared at its ends to form first and second plastic flanges, having an exterior flange face and an interior housing face, said plastic flanges having an outside diameter measuring less than said inside diameter surface of said annular resilient sealing members, said exterior plastic flange faces adapted to sealingly engage complementary plastic flange faces of adjoining pipe segments to be connected;

d. means for resiliently outwardly biasing said plastic flanges; and e. a port formed in the exterior of said housing and adapted for attachment to a fluid detection device.

4. The connector of claim 3 wherein the connector comprises one or more annular fluid openings within said housing, said annular fluid openings being in fluid communication with said port and adapted to receive fluid from an axially external source and transmit said fluid toward said port.

5. The connector of claim 3 wherein the connector comprises an inner seal whereby said plastic flanges are outwardly resiliently biased using one or more spring members to provide sealing against plastic-liner flange faces of connected concentric pipe segments.

6. The connector of claim 3 wherein said annular resilient members are spring-biased to urge sealing against flange faces of connected concentric pipe segments.

7. The connector of claim 3 wherein said housing is made of fire-resistant material.

8. The connector of claim 3 wherein said port comprises a threaded connection within said housing to permit operable connection of fluid detection devices with said connector.

9. A connector used in providing a seal between fixedly connected flanged, plastic lined, concentric pipe segments comprising:

a. a generally annular housing of fire-resistant material;

b. at least one annular resilient sealing member adapted to sealingly engage a complementary flange face of a pipe segment;

c. an inner seal adapted to seal against a plastic-liner flange face of a pipe segment, said inner seal comprising a plastic flange having an exterior flange face adapted to sealingly engage complementary plastic-liner flange faces of adjoining pipe segments to be connected.

10. The connector of claim 9 wherein said annular resilient sealing member is spring-biased to urge a seal of said member against the flange face of a pipe segment.

11. The connector of claim 9 wherein said inner seal is spring-biased to urge a seal of the exterior flange face of the plastic flange against said plastic-liner flange face of a pipe segment.

12. The connector of claim 9 which further comprises a connection port within said housing to permit operable connection of fluid detection device to said connector.

13. The connector of claim 12 which further comprises an annular fluid opening adapted to receive fluid from an axially external source and communicate said fluid toward said connection port.

14. A piping system for permitting dual containment and detection of leaks of piped substances, said piping system comprising:

a. one or more connectors comprising:

(1) a generally annular housing of fire-resistant material;

(2) at least one annular resilient sealing member adapted to seal against a flange face of an adjoining pipe segment;

(3) an inner seal adapted to seal against a plastic-liner flange face of a pipe segment comprising a plastic flange having an exterior flange face adapted to sealingly engage complementary plastic-liner flange faces of adjoining pipe segments to be connected;

(4) a connection port within said housing to permit operable connection of fluid detection devices to said connector; and (5) an annular fluid opening adapted to receive fluid and communicate said fluid toward said port;

b. at least one pipe segment comprising:

(1) an inner shell of a first diameter having a first end and second end and an internal surface defining a fluid pathway through said pipe;

(2) an outer shell of a second diameter greater than said first diameter having a first end and second end, said inner and outer shells having generally the same axial center;

(3) said inner and outer shells defining an annulus therebetween, said inner and outer shells being joined to form a flange at said first and second ends of said pipe segment, said flanges presenting an exterior axial flange face; and (4) an aperture communicating the annulus with the flange face;

(5) a plastic liner which lines the interior of said inner shell, said plastic liner being further flared along said flange face to present a plastic-liner flange face over at least a portion of said flange face.

15. The piping system of claim 14 wherein said piping system comprises an annular containment passageway from which leaks from said inner shell of said piping system may be detected, said annular containment passageway comprising at least one said annulus, at least one said aperture, and at least one said annular fluid opening.

16. A method for detecting leaks of piped substances from a piping system comprising the steps of:

a. constructing a piping system, said piping system comprising:

(1) at least one pipe segment comprising:

(a) an inner shell of a first diameter having a first end and second end and an internal surface defining a fluid pathway through said pipe;

(b) an outer shell of a second diameter greater than said first diameter having a first end and second end, said inner and outer shells having generally the same axial center;

(c) said inner and outer shells defining an annulus therebetween, said inner and outer shells being joined to form a flange at said first and second ends of said pipe segment, said flanges each presenting an exterior axial flange face;

(d) an aperture communicating the annulus with the flange face.

(e) a plastic liner which lines the interior of said inner shell, said plastic liner being further flared along said flange face to present a plastic-liner flange face over at least a portion of said flange face;

(f) a fluid passageway defined within said inner shell;

(2) at least one connector comprising:

(a) a generally annular housing of fire-resistant material;

(b) at least one annular resilient sealing member adapted to seal against the flange face of an adjoining pipe segment;

(c) an inner seal adapted to seal against the plastic-liner flange face of a pipe segment comprising a plastic flange having an exterior flange face adapted to sealingly engage complementary plastic-liner flange faces of adjoining pipe segments to be connected;

(d) a connection port within said housing to permit operable connection of fluid detection devices to said connector; and (e) an annular fluid opening adapted to receive fluid and communicate said fluid toward said port;

3) an annular containment passageway from which leaks from the fluid passageway may be detected, said annular containment passageway comprising at least one said annulus, at least one said aperture, and at least one said annular fluid opening;

b. operably connecting a fluid detection device to said port within the housing of at least one connector of said piping system to assist in detection of a leak of fluid from the inner shell of at least one said pipe segments into the annulus of said pipe segment; and c. permitting said leak of fluid to be detected by said fluid detection means by allowing fluid within said annulus to be communicated through one or more said apertures into said annular fluid opening of one or more said connectors and through said port within said connector's housing toward said fluid detection means.

17. A method of monitoring the containment of piped substances, comprising:

a. flowing a substance through a piping system, comprising:

(1) at least one pipe segment comprising:
(a) an inner shell of a first diameter having a first end and second end and an internal surface defining a fluid pathway through said pipe;
(b) an outer shell of a second diameter greater than said first diameter having a first end and second end, said inner and outer shells having generally the same axial center;
(c) said inner and outer shells defining an annulus therebetween, said inner and outer shells being joined to form a flange at said first and second ends of said pipe segment, said flanges presenting an exterior axial flange face; and
(d) an aperture communicating the annulus with the flange face;
(e) a plastic liner which lines the interior of said inner shell, said plastic liner being further flared along said flange face to present a plastic-liner flange face over at least a portion of said flange face;
(f) a fluid passageway defined within said inner shell; and (2) At least one connector comprising:
(a) a generally annular housing of fire-resistant material;
(b) at least one annular resilient sealing member adapted to seal against the flange face of an adjoining pipe segment;
(c) an inner seal adapted to seal against the plastic-liner flange face of a pipe segment comprising a plastic flange having an exterior flange face adapted to sealingly engage complementary plastic-liner flange faces of adjoining pipe segments to be connected;
(d) a connection port within said housing to permit operable connection of fluid detection devices to said connector; and
(e) an annular fluid opening adapted to receive fluid and communicate said fluid toward said port;

(3) an annular containment passageway from which leaks from the fluid passageway may be detected, said annular containment passageway comprising at least one said annulus, at least one said aperture, and at least one said annular fluid opening;

b. communicating said annular containment passageway with a fluid detection device for the substance flowing through the piping system; and c. monitoring said fluid detection device.

* * * * *